United States Patent [19]

Braun et al.

[11] 3,848,285

[45] Nov. 19, 1974

[54] MACHINING TOOL
[75] Inventors: Dieter Braun; Wolfram Kortendieck, both of Stuttgart, Germany
[73] Assignee: Fortuna-Werke Maschinenfabrik AG, Stuttgart, Germany
[22] Filed: Oct. 18, 1973
[21] Appl. No.: 407,516

[30] Foreign Application Priority Data
Oct. 18, 1972  Germany.......................... 2250980

[52] U.S. Cl. ............................................. 12/17 R
[51] Int. Cl. ......................................... A43d 25/00
[58] Field of Search ........ 12/77, 70.5, 88, 93, 17 R, 12/18.5; 69/6.5

[56]  References Cited
  UNITED STATES PATENTS
3,061,853  11/1962  Quarmby ......................... 12/17 R
3,119,133  1/1964  Smalley et al. ...................... 12/17 R
3,131,458  5/1964  James................................. 12/17 R Primary Examiner—Patrick D. Lawson
Attorney, Agent, or Firm—Walter Becker

[57]  ABSTRACT

A machining tool, especially for use in connection with the manufacturing of shoes, in which a first rotatable tool is journaled by means of a tool spindle while a second rotatable tool is by means of a resilient elastic element supported by the tool spindle or a part thereof in such a way that the machining surfaces of the first and second tools are arranged closely adjacent to each other and are adapted to be made effective substantially simultaneously for machining the workpiece.

7 Claims, 2 Drawing Figures

MACHINING TOOL

The present invention relates to a machining tool which, while not being limited to, is particularly useful for use in connection with the processing and effecting of the upper leather pull-in fold (Oberlederzwickeinschlag) in the manufacture of shoes.

When the upper leather is pulled onto the last, is folded over and finally is pulled onto (Gezwickt) the inner sole, preparatory work is effected for gluing on the shoe sole. The upper leather pull-in fold shows protruding folds in the heel and toe areas. Particularly with upper leather which is pull-folded and held by glue, it is possible during the preparing operation to equalize said folds by knocking them down. Suitable knocking or pounding-up machines have been commercially obtainable for a considerable time. Furthermore, within the region of the upper leather pullin fold it is necessary to remove the leather cover layer from the fleece layer in order to assure a good adherence of the shoe sole. For this purpose various tools and machines are commercially available.

These heretofore known devices have the drawback that during the machining operations they have to be employed one after another and in most instances on separate machines which requires too much unnecessary time.

The roughening requires high skill in order to assure that not too much or too little of the material will be removed. However, also the heretofore known roughening automats, for instance, of the type described in German Auslegeschrift 1,205,422, according to which the roughening tool is templet controlled and passed along the so-called rough contour, do not yield a satisfactory solution. Differences during the preceding folding over of the upper leather as well as different thicknesses of leather produce different protruding folds. The heretofore known machines are unable sufficiently to adapt themselves to these factors which vary from shoe to shoe.

It is, therefore, an object of the present invention to provide a machining tool which will permit a substantially uniform roughening effect and will yield a working surface on the workpiece, which working surface is prepared to an optimum extent.

These and other objects and advantages of the invention will appear more clearly from the following specification, in connection with the accompanying drawings, in which.

The machining tool according to the present invention is characterized primarily in that a first rotatable maching tool is journaled by means of a tool spindle while a second rotatable machining tool is, by means of a resiliently elastic element, mounted on the machining spindle or parts thereof in such a way that the machining surfaces of said first and said second machining tool are located closely adjacent to each other and are adapted substantially simultaneously to be made effective for machining the workpiece to be machined.

The advantage of a machining tool according to the present invention consists primarily in that two machining operations can almost simultaneously be carried out so that considerable machining time will be saved and that the first machining tool simultaneously determines the effect of the second machining tool onto the workpiece.

For purposes of machining the upper leather pulled-in fold during the manufacturing of shoes, the said first tool is, according to the present invention, designed as knocking-on tool whereas the second machining tool is designed as roughening tool.

It has proved particularly advantageous to have a spring elastic element mounted between two counterbearings which are respectively frictionally connected to the first and second machining tool. It is furthermore advantageous that at least one of the counterbearings is made adjustable for purposes of setting the spring force of the resilient-elastic element. In this way, the influence of the second machining tool, in other words, of the roughening tool, can be adapted to the properties of the material of the workpiece.

Figure 1:
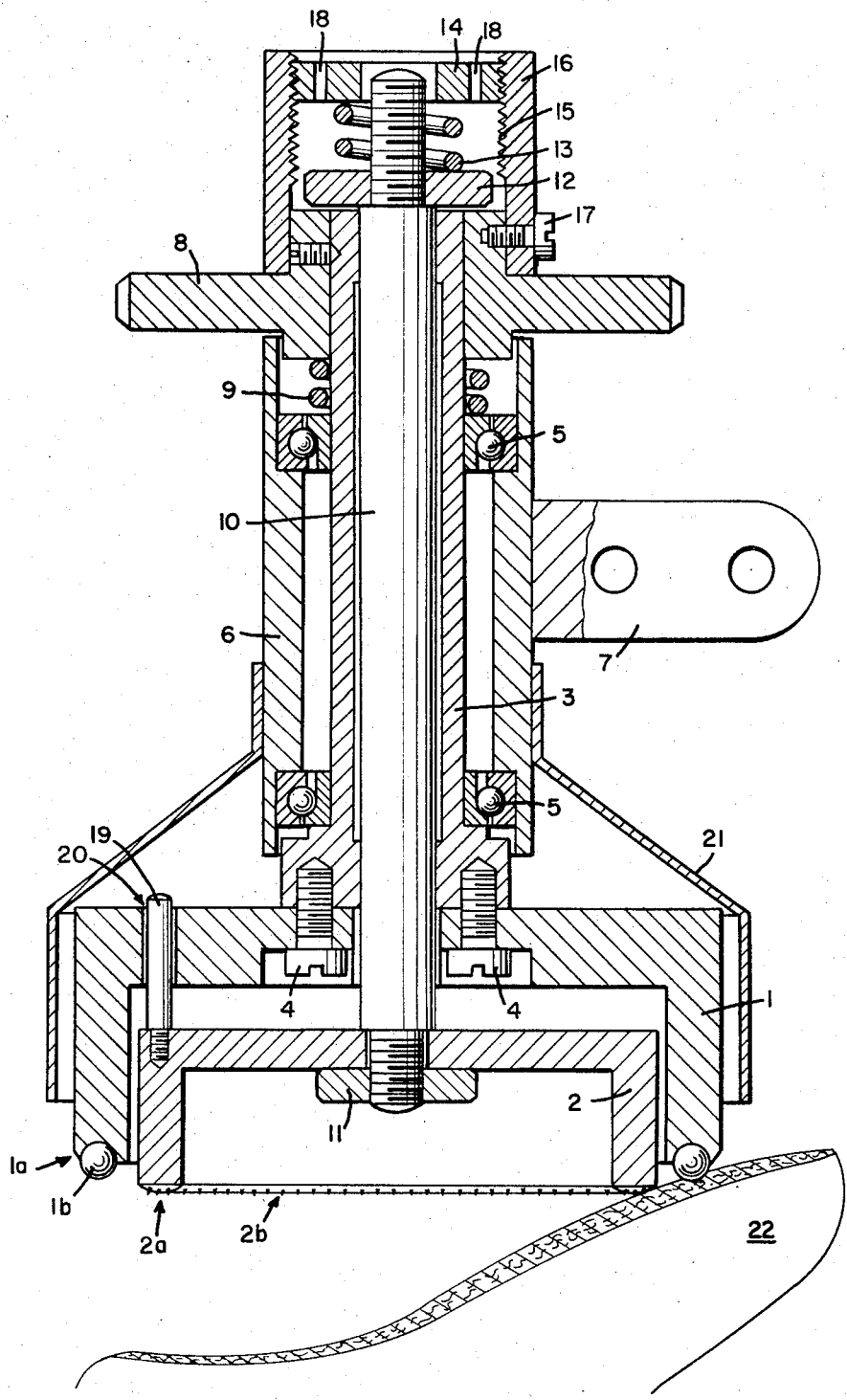
FIG. 1 shows a longitudinal section through a first embodiment of a machining tool according to the present invention.

Referring now to the drawings in detail, FIG. 1 shows a first tool 1 and a second tool 2 which are respectively inverted-pot-shaped and the free edges 1a and 2a respectively of which are designed as machining surfaces. Thus, at the circumference of the pot edge 1a there are arranged a plurality of beating balls 1b to carry out the beating function, whereas the top edge 2a has sharp-edged diamond tips 2b arranged therein so that the tool 2 can carry out its function as roughening tool. The first tool 1 is, by means of screws 4, connected to a first spindle shaft 3 which is designed as a hollow shaft. The first spindle shaft 3 is, by means of antifriction bearings 5 journaled directly in a spindle housing 6 having arranged thereon a connecting flange 7. By means of this connecting flange, the machining tool can, for instance, be fastened stationarily to a machine frame or machine stand or it may be movably arranged in a machine automat. At that end of the first spindle shaft 3 which is located opposite the first tool 1, the spindle shaft 3 is equipped with a driving gear 8 which is operatively connected to a driving device, not illustrated. A spring 9 serves for holding the antifriction bearing 5 in sealing position.

The second tool 2 is secured, for instance, by a nut 11 to a second spindle shaft 10 which passes through the first spindle shaft 3 and is axially displaceable. A further screw nut 12 is screwed to the opposite end of the second spindle shaft 10. The screw nut 12 serves on one hand to limit the axial play of the second spindle shaft 10, and on the other hand represents a counterbearing for a spring elastic element, which in this particular instance is formed by a helical spring 13. The second counterbearing for the helical spring 13 is formed by a cover plate 14 which is provided with an outer thread, said cover plate 14 being secured by a sleeve 16 provided with an inner thread 15. The sleeve 16 is, in its turn, screwed onto a driving gear 8 by means of screws 17, said driving gear 8 being connected to the spindle shaft 3 by set screw means 17a. The two bores 18 serve for receiving a portion of a tool, by means of which, the cover plate 14 can be adjusted for setting the spring force or thrust of the helical spring 13.

For purposes of simplification, FIG. 1 has been so designed that the first tool 1 and the second tool 2 are together driven in the same direction by a single driving device. As coupling element between the two tools, there is provided a bolt 19 which is connected to the second tool 2 and which extends through a bore 20 in the first tool 1. Finally, a protective cover 21 may be placed upon the spindle housing 6.

For purposes of illustration, a shoe 22 has been indicated. The upper leather pull-in fold has to be machined. When guiding the machining tool along the rough contour, care is to be taken that the roughening tool will become effective after the knocking tool. In this way, the pressure at which the knocking tool is pressed against the shoe is not very critical because no material is removed. The critical pressure between shoe and roughening tool is dependent exclusively on the preload of the helical spring 13 due to the fact that the knocking tool simultaneously acts as guiding tool. When the shoes to be machined are applied manually to the machining tool according to the invention, the concentrating ability of the operator is taxed to a considerably lower extent; but also in case of an automatic machining tool, the machining tool according to the invention will at low structural and control-technical requirements yield a very satisfactory machining result.

Figure 2:
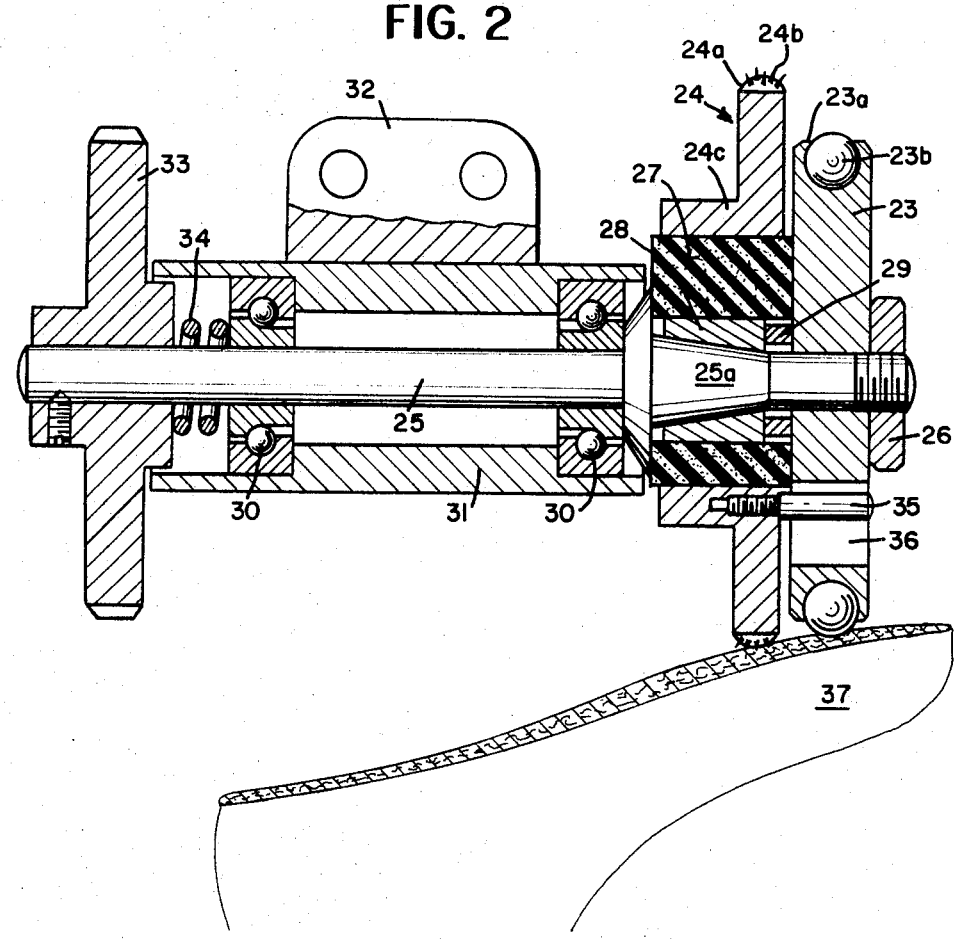
FIG. 2 is a longitudinal section through a second embodiment of the present invention.

According to FIG. 2, a first tool 23 and a second tool 24 are respectively designed as circular discs. The outer circumferential surfaces 23a and 24a respectively are designed as machining surfaces. Corresponding to the function as knocking down tool, the outer circumferential surface 23a of the first tool 23 has embedded therein a plurality of beating balls 23b. The outer circumferential surface 24a of the second tool 24 has inserted therein sharp diamond points in conformity with its function as roughening tool. The first tool 23 is directly connected to a shaft 25 of the tool spindle, for instance, by means of a screw nut 26. In the immediate vicinity of the first tool 23, a resiliently elastic element 27 is mounted on shaft 25. This element 27 on which the second tool 24 is mounted is in the specific instance shown in FIG. 2 formed by a ring of rubber-like material. A flange-shaped extension 24c of the second tool 24 serves as counterbearing for the resiliently elastic element 27. As second counterbearing there is employed a ring 28 which is alternately slotted from opposite end faces. Ring 28 has an inner conical surface which engages a corresponding conical section 25a of shaft 25. The axial position of ring 28 is determined by a spacer ring 29 which rests on the first tool 23. The width of the spacer ring 29 thus determines the radial extension of ring 28 and thus also determines the load of the resiliently elastic element 27.

Shaft 25 is, in a manner known per se, journaled in a spindle housing 31 by means of an antifriction bearing 30. Housing 31 is provided with a connecting flange 32. Connected to shaft 25 is also a driving gear 33 for driving shaft 25 while said gear 33 is adapted to be operatively connected to a driving device. A spring 34 serves for holding the antifriction bearing 30 in sealing position.

With the embodiment illustrated in FIG. 2, it is for purposes of simplification likewise provided that the first tool 23 and the second tool 24 are driven in the same direction by a common driving device. For purposes of coupling the two tools together, a bolt 35 is screwed into the end face of the second tool 24. Bolt 35 extends through a radial slot 36 of the first tool 23.

For purposes of simplifying the illustration of the function of the tool according to the invention, a shoe 37 is indicated, the upper leather pull-in fold of which, is to be machined. It is to be noted that the second tool 24 has a greater outer diameter than the first tool 23. When the shoe 37 is placed against the first tool 23, the second tool 24 is forced to carry out a radial escaping movement. This brings about a resiliently elastic deformation of the resiliently elastic element 27. The elasticity of the rubber-like material and the preload in view of the position of ring 28 with inner conical surface thus determine the pressure at which the second tool 24 presses against the shoe 37.

The operation and the advantages in connection with the design illustrated in FIG. 1 also apply to the machining tool of FIG. 2 in a corresponding manner.

It is, of course, to be understood that the present invention is by no means limited to the specific showing in the drawings, but also comprises any modifications within the scope of the appended claims. It is also to be noted that the present invention while being described as being used in connection with the manufacture of shoes, may, of course, also be used in connection with other manufacturing processes in which similar problems are involved.

What we claim is:

1. A machining tool, especially for use in connection with the manufacturing of shoes, which includes: bearing means, spindle means rotatably supported by said bearing means, first rotatable tool means connected to said spindle means for rotation with the latter, second rotatable tool means having the axis of rotation thereof substantially coaxially arranged with regard to the axis of rotation of said first tool means, and resilient elastic means interposed between said second rotatable tool means and said spindle means, said first and second tool means respectively being provided with machining surfaces located closely adjacent to each other so as to be adapted substantially simultaneously to act upon a workpiece to be machined thereby.

2. A machining tool according to claim 1, in which the machining surface of said first rotatable tool means is provided with ball means thereby permitting said first rotatable tool means to act as beating tool, and in which the machining surface of said second rotatable tool means is provided with roughening means to thereby enable said second rotatable tool means to act as roughening tool.

3. A machining tool according to claim 1, which includes first counterbearing means operatively connected to said first rotatable tool means, and second counterbearing means operatively connected to said second rotatable tool means, said resilient elastic means being arranged between said first and said second counterbearing means.

4. A machining tool according to claim 1, in which at least one of said counterbearing means is adjustable to vary the thrust of said resilient elastic means.

5. A machining tool according to claim 1, in which said spindle means forms a hollow spindle and said first rotatable tool means comprises a first inverted pot-shaped member, and in which said second rotatable tool means comprises a second inverted potshaped member coupled to and arranged at least partially within said first inverted pot-shaped member and extending through and guided by said hollow spindle, said resilient elastic means being formed by spring means under preload continuously urging said second rotatable tool means in axial direction thereof out of said rotatable tool means.

6. A machining tool according to claim 1, in which said first rotatable tool means comprises first disc means having its peripheral surface provided with means for beating against a workpiece to be machined and also comprises a rotatable spindle firmly connected to said first disc means and rotatably supported by said bearing means; said machining tool furthermore including: second disc means forming said second rotatable tool means and being of annular shape while having an outer diameter greater than the outer diameter of said first disc means with the outer periphery of said second disc means having a roughened surface; coupling means coupling said first and second disc means to each other for rotating together, said spindle extending through the central portion of said second disc means, first counterbearing means arranged in that portion of said spindle which is within the region of said second disc means, and second counterbearing means connected to said second disc means and arranged in radially spaced relationship to said first counterbearing means, said resilient elastic means being interposed between said first and second counterbearing means.

7. A machining tool according to claim 6, in which said resilient elastic means comprises elastomeric material.

* * * * *